United States Patent
Ram et al.

(10) Patent No.: US 7,697,532 B2
(45) Date of Patent: Apr. 13, 2010

(54) FRAME CONCATENATION WITH DROP PRECEDENCE ASSIGNMENT

(75) Inventors: Rafi Ram, Herzliya (IL); Leon Bruckman, Petah Tikva (IL)

(73) Assignee: Corrigent Systems Ltd., Tel Aviv (IL)

( * ) Notice: Subject to any disclaimer, the term of this patent is extended or adjusted under 35 U.S.C. 154(b) by 666 days.

(21) Appl. No.: 11/704,615

(22) Filed: Feb. 8, 2007

(65) Prior Publication Data

US 2008/0192747 A1 Aug. 14, 2008

(51) Int. Cl.
   H04L 12/28 (2006.01)
(52) U.S. Cl. .................. 370/392; 370/230; 370/257; 370/395.42
(58) Field of Classification Search ............. None
   See application file for complete search history.

(56) References Cited

U.S. PATENT DOCUMENTS

| | | | |
|---|---|---|---|
| 5,481,542 A | 1/1996 | Logston et al. | |
| 6,646,988 B1 * | 11/2003 | Nandy et al. | 370/235 |
| 7,139,281 B1 * | 11/2006 | Bodin | 370/412 |
| 7,586,848 B1 * | 9/2009 | Gunduzhan | 370/235 |
| 2007/0140359 A1 | 6/2007 | Ehret et al. | |

OTHER PUBLICATIONS

Moon et al., "IP Concatenation: The Method for Enhancement of IPsec Performance", Lecture Notes in Computer Science (LNCS)—High Speed Networks and Multimedia Communications, vol. 2720/2003, pp. 365-374 (2004).
Rosen et al., RFC 3031, "Multiprotocol label switching architecture", (2001).
Martini et al., in an IETF Internet Draft, "Encapsulation Methods for Transport of ATM Over MPLS Networks", (2006).
IEEE 802.17 Working Group, available at www.ieee802.org/17.
Pazhyannur et al., RFC 3153, "PPP Multiplexing" (2001).
The ATM Forum, ATM-MPLS Network Interworking, Version 2.0 (2003).
Ka Yeung, "802.11 Modeling and MAC Enhancements for High Speed Rate Adaptive Networks," (2002).
S. Bryant et al., "Pseudo Wire Emulation Edge-toEdge (PWE3) Architecture", RFC 3985 (2005).
S. Hanks et al., "Generic Routing Encapsulation (GRE)", RFC 1701 (1994).

* cited by examiner

*Primary Examiner*—Duc C Ho
(74) *Attorney, Agent, or Firm*—Darby & Darby P.C.

(57) ABSTRACT

A method for communication includes encapsulating multiple data packets, which carry data and have respective drop precedence (DP) values selected from a range of possible DP values, to produce a concatenated frame of a transport protocol. A composite drop precedence (CDP) value is assigned from the range to the concatenated frame using a pseudorandom assignment function that depends on a distribution of the DP values of the data packets in the concatenated frame. The concatenated frame is transported through a communication network using the transport protocol, in accordance with the pseudo-randomly assigned CDP value.

19 Claims, 4 Drawing Sheets

FRAME CONCATENATION WITH DROP PRECEDENCE ASSIGNMENT

FIELD OF THE INVENTION

The present invention relates generally to communication networks, and particularly to methods and systems for transporting concatenated frames over data communication networks.

BACKGROUND OF THE INVENTION

Some communication networks use concatenation and encapsulation methods for transporting cells or other data frames. In these methods, multiple cells or frames are encapsulated and transported over the network using a transport protocol. The concatenation process reduces the overhead associated with adding headers to the individual data packets, relieves the network nodes of the task of individually processing each data packet and, provides functions such as end-to-end connectivity, Quality-of-Service (QoS) and protection.

For example, Asynchronous Transfer Mode (ATM) cells are sometimes encapsulated and transported using the Multiprotocol Label Switching (MPLS) protocol. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. This reference is available at www.ietf.org/rfc. Methods for encapsulating ATM cells in MPLS packets are described by Martini et al., in an IETF Internet Draft entitled "Encapsulation Methods for Transport of ATM Over MPLS Networks," May, 2006, which is incorporated herein by reference. This document is available at www.ietf.org/internet-drafts/draft-ietf-pwe3-atm-encap-11.txt.

In some cases, the encapsulated packets are transported over ring networks, such as Resilient Packet Ring (RPR) networks, as defined by the IEEE 802.17 working group. Applicable standards and additional details regarding RPR networks are available at www.ieee802.org/17.

SUMMARY OF THE INVENTION

There is therefore provided, in accordance with an embodiment of the present invention, a method for communication, including:

encapsulating multiple data packets, which carry data and have respective drop precedence (DP) values selected from a range of possible DP values, to produce a concatenated frame of a transport protocol;

assigning a composite drop precedence (CDP) value from the range to the concatenated frame using a pseudo-random assignment function that depends on a distribution of the DP values of the data packets in the concatenated frame; and transporting the concatenated frame through a communication network using the transport protocol, in accordance with the pseudo-randomly assigned CDP value.

In some embodiments, the transport protocol includes a Multiprotocol Label Switching (MPLS) protocol. In another embodiment, the data packets include Asynchronous Transfer Mode (ATM) cells. Additionally or alternatively, the data packets include Ethernet frames. In some embodiments, the communication network includes a ring network.

In a disclosed embodiment, the pseudo-random assignment function is defined such that a likelihood of assigning a certain CDP value from the range is proportional to a relative amount of the data in the concatenated frame, which is carried by the data packets whose DP value equals the certain CDP value.

In another embodiment, assigning the CDP value includes generating a pseudo-random number that is greater than zero and is distributed between zero and unity, assigning the concatenated frame a first CDP value when the pseudo-random number is no greater than the relative amount of the data, and assigning the concatenated frame a second CDP value, which indicates a higher drop precedence with respect to the first CDP value, when the pseudo-random number is greater than the relative amount of the data. Assigning the CDP value may include reading the relative amount of the data from a Look-Up Table (LUT). Additionally or alternatively, assigning the CDP value may include generating the pseudo-random assignment function using a Linear Feedback Shift Register (LFSR).

In yet another embodiment, the pseudo-random assignment function is defined such that a likelihood of assigning a certain CDP value from the range depends on a number of the data packets, which are encapsulated in the concatenated frame and whose DP value equals the certain CDP value.

There is additionally provided, in accordance with an embodiment of the present invention, a network node, including:

A network interface, which is arranged to communicate with a communication network; and a processor, which is arranged to encapsulate multiple data packets, which carry data and have respective drop precedence (DP) values selected from a range of possible DP values, so as to produce a concatenated frame of a transport protocol, to assign a composite drop precedence (CDP) value from the range to the concatenated frame using a pseudo-random assignment function that depends on a distribution of the DP values of the data packets in the concatenated frame, and to send the concatenated frame to the communication network using the network interface, so as to transport the concatenated frame through the communication network using the transport protocol, in accordance with the pseudo-randomly assigned CDP value.

There is further provided, in accordance with an embodiment of the present invention, a computer software product used in a network node, the product including a computer-readable medium, in which program instructions are stored, which instructions, when read by a processor, cause the processor to encapsulate multiple data packets, which carry data and have respective drop precedence (DP) values selected from a range of possible DP values, so as to produce a concatenated frame of a transport protocol, to assign a composite drop precedence (CDP) value from the range to the concatenated frame using a pseudo-random assignment function that depends on a distribution of the DP values of the data packets in the concatenated frame, and to send the concatenated frame to a communication network, so as to transport the concatenated frame through the communication network using the transport protocol, in accordance with the pseudo-randomly assigned CDP value.

The present invention will be more fully understood from the following detailed description of the embodiments thereof, taken together with the drawings in which:

DETAILED DESCRIPTION OF EMBODIMENTS

Overview

Figure 1:
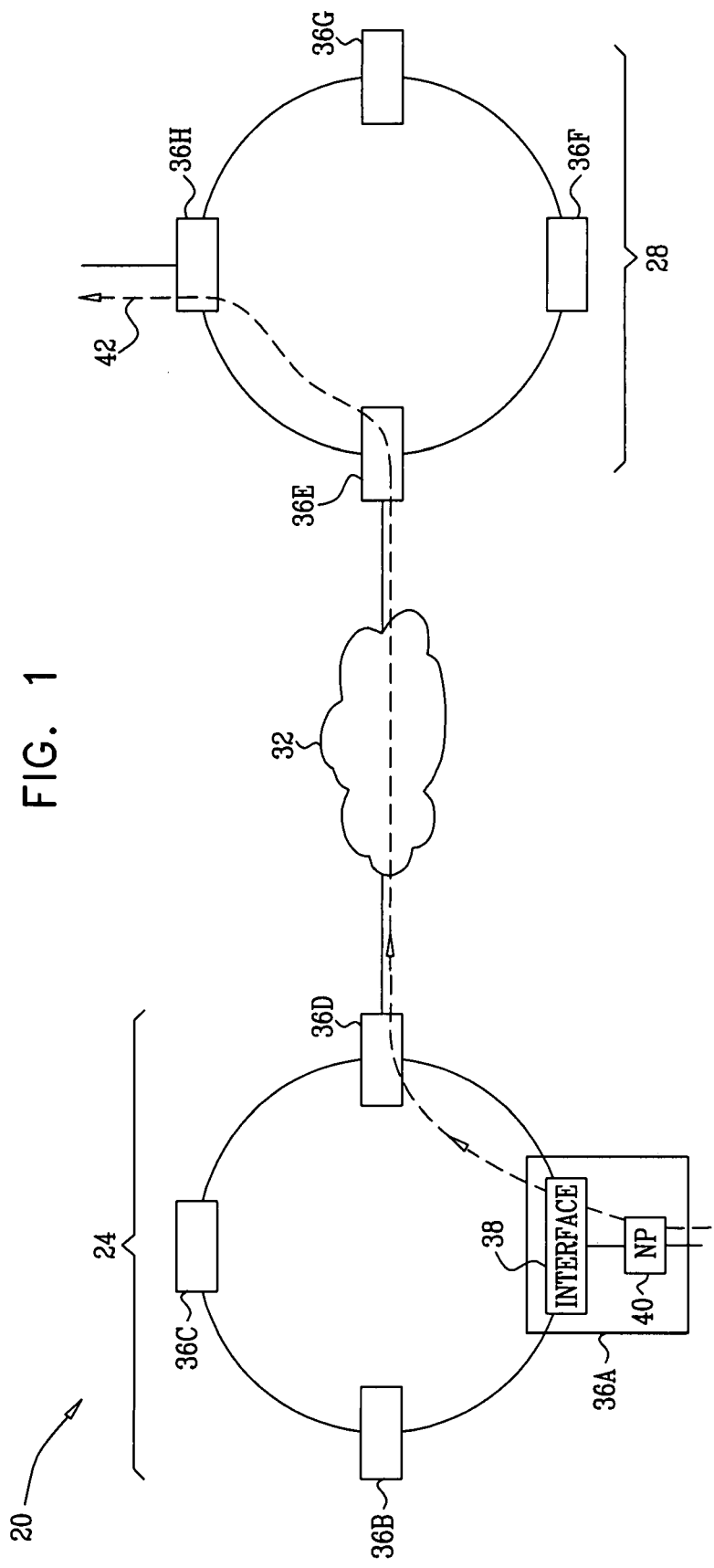
FIG. 1 is a block diagram that schematically illustrates a communication network, in accordance with an embodiment of the present invention.

In some communication networks, data packets are assigned different drop precedence (DP) values, which define priorities among the packets when the packets compete for network resources, such as bandwidth. For example, a certain network connection may have QoS specifications, which define certain Committed Information Rate (CIR) and Peak Information Rate (PIR) values. The difference between the peak and committed rates is referred to as an Excess Information Rate (EIR). In order to comply with these QoS specifications, network nodes that serve the connection should guarantee bandwidth that is at least equal to the CIR to the connection. When excess bandwidth is available, additional bandwidth can be allocated for transporting EIR-rated traffic.

A possible method for implementing this QoS policy is to assign a low DP value to the data packets transmitted over the connection, up to the CIR. When the CIR is exceeded, subsequent data packets are assigned a high DP value. When network congestion occurs, such as when bandwidth is "overbooked" by different connections or services, packets assigned a high DP value may be dropped.

In some cases, a connection may use a transport protocol, such as MPLS, that encapsulates the data packets at the ingress of the connection to produce concatenated frames. Each concatenated frame, which comprises multiple data packets, is regarded by the network nodes along the connection as a single unit. Regardless of the encapsulation applied by the transport protocol, the connection is expected to comply with the CIR and PIR specifications. This requirement is often problematic, since although the individual data packets encapsulated within the concatenated frame may have different DP values, the concatenated frame must be either forwarded or discarded as a whole.

Embodiments of the present invention provide methods and systems for processing concatenated frames, which comprise data packets having different DP assignments, while meeting the QoS specifications of the connection.

In some embodiments, the network node via which the data packets enter the network, which is referred to as the ingress node, encapsulates the data packets to form concatenated frames of the transport protocol. The data packets arriving at the ingress node are pre-assigned respective DP values, which are selected from a range of possible DP values. In many cases the range comprises two values, i.e., a low DP value (denoted DP=0) and a high DP value (denoted DP=1), although a higher number of DP values can also be used.

The ingress node assigns each concatenated frame a composite DP (CDP) value, which is subsequently used by the network nodes along the connection in order to determine whether to forward or drop the concatenated frame. The CDP value is selected from the range of possible values using a pseudo-random assignment function, which depends on the statistical distribution of the DP values of the data packets in the concatenated frame.

In some embodiments, the pseudo-random assignment function is defined such that the likelihood of selecting and assigning a certain value is proportional to the relative amount of data that is carried by the data packets in the concatenated frame with individual DP set to this value. For example, assume that all data packets in the concatenated frame carry the same amount of data, and that 30% of the data packets are assigned DP=0 and 70% are assigned DP=1. In this case, the ingress node pseudo-randomly selects a composite DP value for the concatenated frame, such that the selection process has a 30% likelihood of assigning CDP=0 and a 70% likelihood of assigning CDP=1. An exemplary pseudo-random assignment process that provides these likelihoods is described below.

Alternatively, other suitable pseudo-random functions can also be used. For example, the likelihood of assigning a particular CDP value to the concatenated frame may depend on the number of data packets that have their individual DP set to this value.

The network nodes along the connection determine whether to forward or drop the concatenated frames based on their respective CDP values. The node via which the data packets leave the network, referred to as the egress node, accepts the concatenated frames that were not dropped along the connection, extracts the individual data packets and forwards them to their destinations.

Since the likelihood of assigning a particular CDP value to a concatenated frame depends on the statistical distribution of the DP values of the data packets in the frame, the rates of forwarded and dropped data packets closely follow the specified QoS specifications of the connection, when averaged over a large number of concatenated frames.

Unlike some known QoS methods, which determine whether to drop or forward packets based on externally-provided a-priori information (such as an a-priori definition of the CIR and PIR values and the expected numbers of DP=0 and DP=1 data packets), which may be inaccurate or obsolete, the methods and systems described herein determine whether to drop or forward packets based on the current statistics of the actual traffic transported over the network. As a result, the connection is able to closely meet its QoS specification, thus improving the efficiency of allocating network resources.

System Description

FIG. 1 is a block diagram that schematically illustrates a communication network 20, in accordance with an embodiment of the present invention. Typically, network 20 comprises an Internet Protocol (IP) network. In the exemplary embodiment of FIG. 1, network 20 comprises two RPR networks 24 and 28, which are connected by an MPLS network 32. Alternatively, the configuration of network 20 may comprise a single RPR network, or any other suitable local-area, metropolitan-area and/or wide-area network configuration known in the art.

Ring network 24 comprises ring nodes 36A . . . 36D, and ring network 28 comprises ring nodes 36E . . . 36H. Network 32 typically comprises multiple nodes, which are not shown in the figure for the sake of clarity. Each node comprises a network interface 38, which connects the node to the network, and a network processor (NP) 40, which carries out the different packet processing functions of the node. In particular, NP 40 carries out the packet concatenation, encapsulation and de-capsulation described herein.

The functions of NP 40 may be implemented in hardware, such as using an application-specific integrated circuit (ASIC) or field-programmable gate array (FPGA), using software, or using a combination of hardware and software elements. In some embodiments, NP 40 comprises a general-purpose processor, which is programmed in software to carry out the functions described herein. The software may be downloaded to the processor in electronic form, such as over a network.

A connection 42 is defined over network 20. In the present example, connection 42 carries data packets, which enter network 20 at node 36A of ring 24 and exit network 20 at node 36H of ring 28. Node 36A is referred to as the ingress node, and node 36H is referred to as the egress node of the connection. Although in the present example the ingress and egress nodes reside in different ring networks, these nodes may alternatively reside in the same ring network or in network 32.

The ingress node accepts data packets belonging to connection 42, in order to transport the packets over the connection to the egress node. The data packets may comprise ATM cells, Ethernet™ frames and/or any other packet type. The data packets may originate from any number of sources and may be associated with any number of communication services. The frames may all have the same size and carry the same amount of data, or may alternatively have different sizes and carry different amounts of data.

Connection 42 uses a certain transport protocol for encapsulating the data packets and transporting them via network 20 from the ingress node to the egress node. The transport protocol typically reduces the overhead associated with adding headers to the individual data packets, relieves the nodes along the connection of the task of individually processing each data packet, and provides functions such as end-to-end connectivity, QoS and protection.

The ingress node produces concatenated frames of the transport protocol, with each concatenated frame comprising one or more data packets. For example, in some embodiments connection 42 is used to transport ATM traffic over an MPLS network. In these embodiments, connection 42 comprises an MPLS Label-Switched Path (LSP), also referred to as an MPLS tunnel, and the data packets comprise ATM cells. Alternatively, any other suitable connection type, transport protocol and type of data packets can be used. For example, the data packet may comprise Ethernet frames and the transport protocol may comprise the Internet Protocol (IP).

Figure 2:
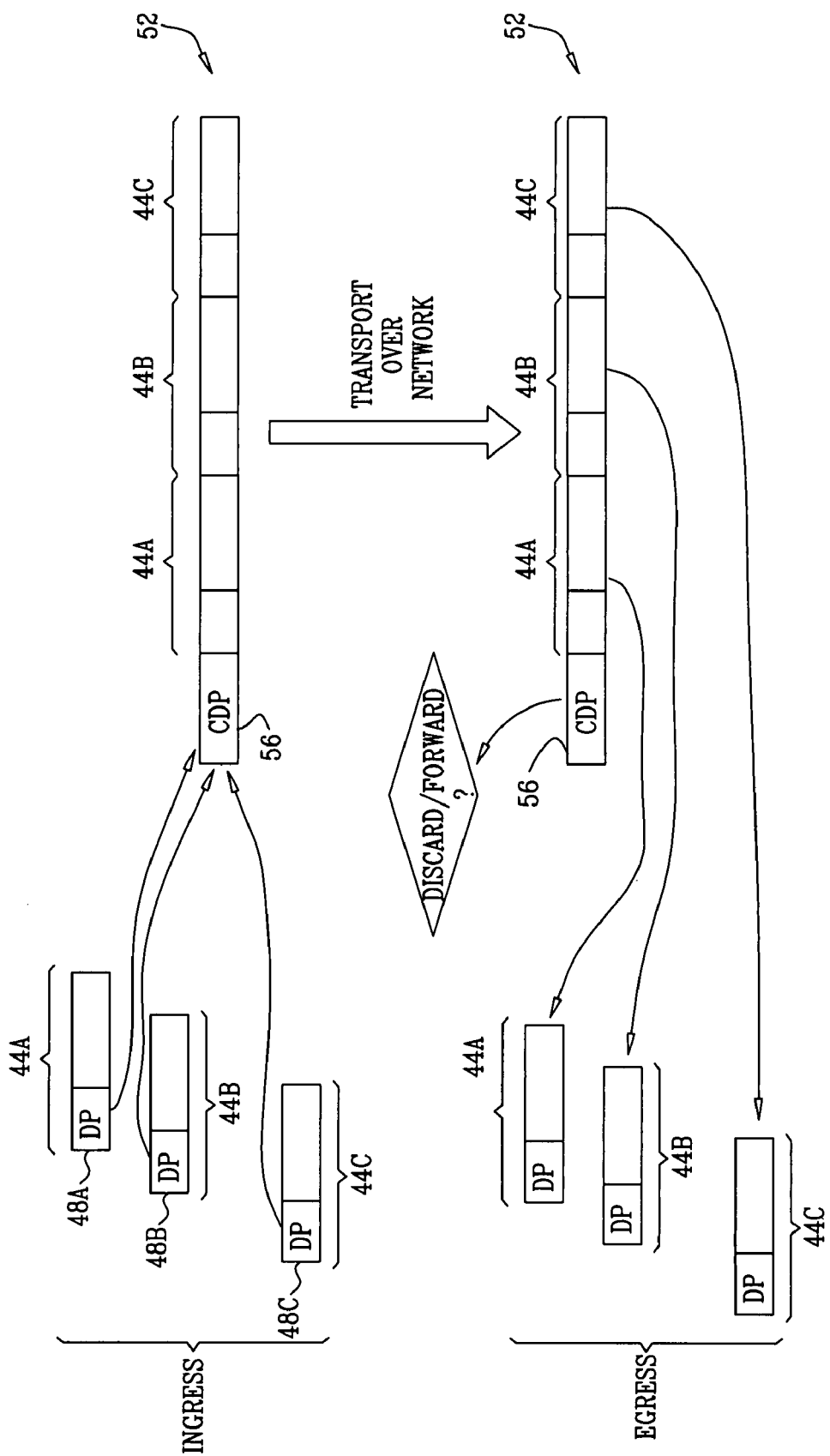
FIG. 2 is a diagram that schematically illustrates concatenation and de-concatenation of data packets, in accordance with an embodiment of the present invention.

FIG. 2 is a diagram that schematically illustrates concatenation and de-concatenation of data packets, in accordance with an embodiment of the present invention. In the example of FIG. 2, three data packets 44A . . . 44C are encapsulated by the ingress node. Each data packet accepted by the ingress node is pre-assigned a drop precedence (DP) value, which defines its relative importance with respect to the other data packets, as is known in the art. Data packets 44A . . . 44C comprise respective DP header fields 48A . . . 48C, which hold the pre-assigned DP values.

The ingress node encapsulates data packets 44A . . . 44C, to produce a concatenated frame 52 of the transport protocol. The ingress node determines a composite drop precedence (CDP) value for the concatenated frame in a pseudo-random manner, as will be explained in detail further below. Concatenated frame 52 comprises a CDP header field 56, which holds the CDP value assigned to the frame by the ingress node.

Concatenated frame 52 is transported using the transport protocol over connection 42. The network nodes along the connection process the concatenated frame in accordance with the transport protocol. In particular, when congestion occurs and different concatenated frames compete for network bandwidth, the nodes determine whether to forward or drop each concatenated frame based on its CDP value. The network nodes usually have no visibility or access to the DP values of the individual data packets within the concatenated frame.

Assuming concatenated frame 52 is not dropped, the egress node accepts the frame, extracts data packets 44A . . . 44C and forwards each data packet to its destination.

Composite Drop Precendence Assignment Method

Figure 3:
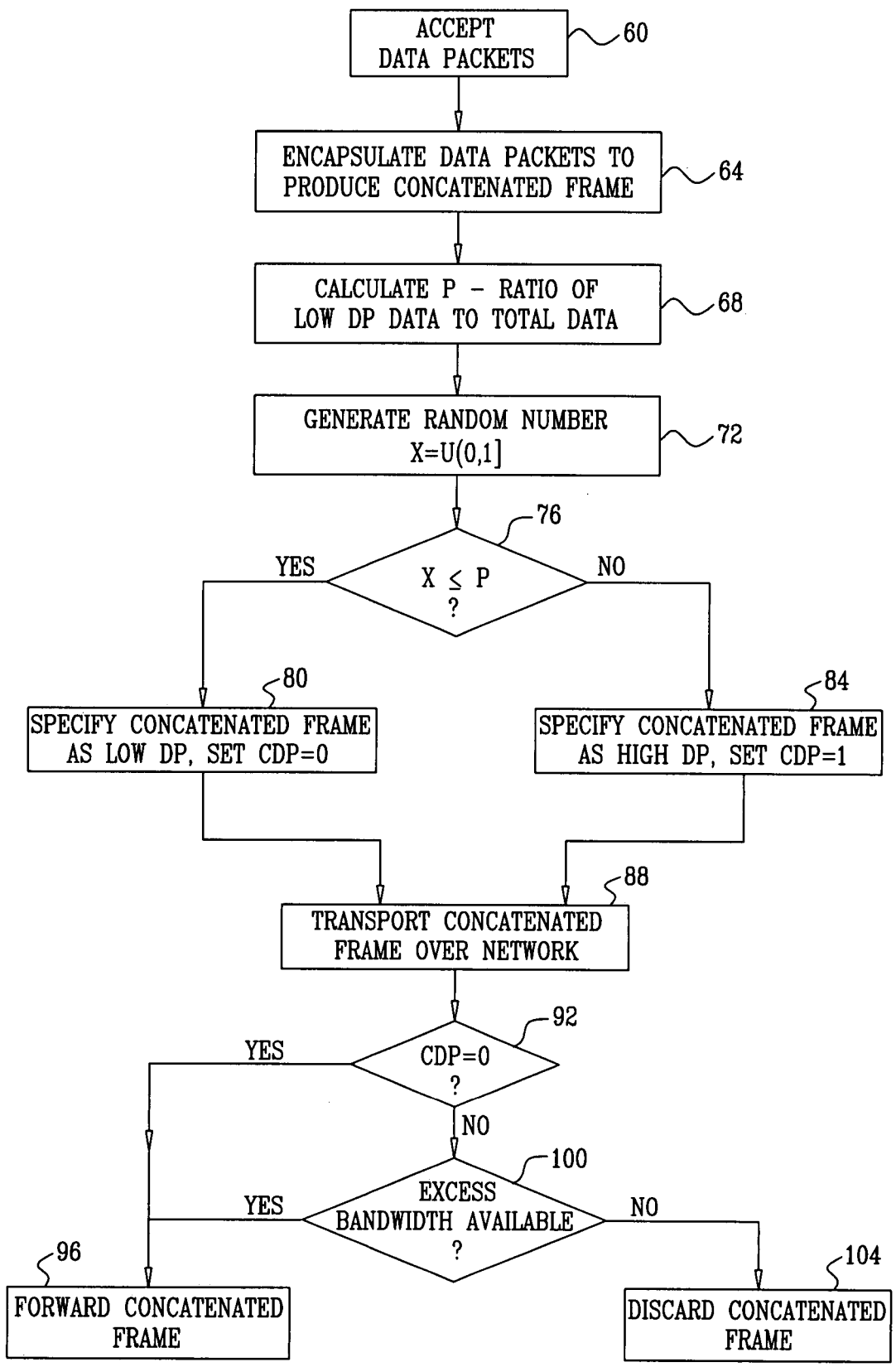
FIG. 3 is a flow chart that schematically illustrates a method for transporting concatenated frames using drop precedence assignment, in accordance with an embodiment of the present invention.

FIG. 3 is a flow chart that schematically illustrates a method for transporting concatenated frames using drop precedence assignment, in accordance with an embodiment of the present invention. The method begins with the ingress node accepting data packets, which belong to a particular connection, at a packet acceptance step 60. Each data packet is pre-assigned a DP value, which is selected from a range of possible values. In the description that follows, the range comprises two values: a low DP value (DP=0) and a high DP value (DP=1). Alternatively, any other number of possible values, such as a range of low, medium and high drop precedence values, can also be used.

The ingress node encapsulates the data packets and produces concatenated frames, at a concatenation step 64. The ingress node can encapsulate any desired number of data packets in each concatenated frame and use any desired policy or logic in order to determine how to divide the data packets into the concatenated frames. For example, in some embodiments, each concatenated frame comprises a fixed, predetermined number of data packets. In alternative embodiments, the maximum latency introduced by the encapsulation process may be bounded. In these embodiments, the ingress node may accumulate the arriving data packets up to a certain latency time-out. When the time out expires, all pending data packets are encapsulated. As a result, the concatenated frames have a varying number of data packets. Further alternatively, the ingress node may have an upper bound on the allowed latency, as well as an upper bound on the maximum number of data packets in each concatenated frames.

The ingress node determines and assigns a composite drop precedence (CDP) value to each concatenated frame. The ingress node selects the CDP value from the range of the possible values using a pseudo-random assignment function, such that the likelihood of selecting and assigning a certain CDP value depends on the distribution of the DP values of the data packets in the concatenated frame. In the present example, the likelihood of selecting and assigning a certain CDP value is proportional to the relative amount of data, which is carried by the data packets in the concatenated frame, whose DP values is equal to this value.

Steps 68-84 that follow describe an exemplary process for pseudo-randomly selecting the CDP value of a concatenated frame when the pre-assigned DP values of the individual data packets comprise two values, i.e., DP=0 and DP=1.

The ingress node calculates the relative amount of data in the concatenated frame, which is carried by low-DP data packets, at a data ratio calculation step 68. The ingress node calculates the ratio between the amount of data in the concatenated frame that is carried by low-DP data packets and between the total amount of data carried by the concatenated frame. This ratio is denoted P. When calculating P, the ingress node typically considers only the payload data, or user data, of the packets and ignores header fields and other control information. In some cases, such as when transporting ATM cells, all data packets carry the same amount of data. In these cases, the ingress node may determine P by calculating the ratio between the number of low-DP data packets and the total number of data packets in the concatenated frame, without explicitly measuring the amounts of data.

For each concatenated frame, the ingress node generates a pseudo-random number, which is distributed uniformly between zero and unity, excluding zero, at a pseudo-random generation step 72. The generated number is denoted X. In some embodiments, the ingress node generates X using a Linear Feedback Shift Register (LFSR), as is known in the art. An exemplary LFSR configuration is described in FIG. 4 below.

The ingress node compares ratio P to the pseudo-random number X, at a comparison step 76. If $X \leq P$, the ingress node assigns a CDP=0 value to the concatenated frame, at a low CDP assignment step 80. Otherwise, i.e., is X>P, the ingress node assigns a CDP=1 value to the concatenated frame, at a high CDP assignment step 84.

As can be appreciated, in the process of steps 68-84 above, the likelihood of assigning CDP=0 to a concatenated frame is proportional to the relative amount of data carried by low-DP data packets in the frame. Similarly, the likelihood of assigning CDP=1 to a concatenated frame is proportional to the relative amount of data carried by high-DP data packets in the frame.

The process of steps 68-84 above can be generalized and used when the pre-assigned DP values can take a higher number of possible values. For example, consider a range of four possible DP values denoted 0, 1, 2 and 3. The relative occurrences of these four DP values in a particular concatenated frame are denoted P0, P1, P2 and P3, respectively. Possible decision logic for assigning the CDP to this frame can be the following:

if $X \leq P0$, assign CDP=0, else
if $X \leq (P0+P1)$, assign CDP=1, else
if $X \leq (P0+P1+P2)$, assign CDP=2, else assign CDP=3.

Alternatively, any other suitable method for pseudo-randomly selecting the CDP values with the appropriate likelihoods can also be used.

Having assigned the CDP value, the ingress node forwards the concatenated frame over connection 42, at a transporting step 88. The network nodes along the connection extract the CDP value from the concatenated frame, and determine whether to drop or forward the frame based on the CDP value.

When such a network node accepts the concatenated frame, the node checks whether CDP=0, at a CDP checking step 92. If CDP=0, the node forwards the frame, at a forwarding step 96. In particular, when the node processing the frame is the egress node, the node de-concatenates the frame, extracts the individual data packets and forwards each data packet to its destination.

If the node concludes that CDP=1 at CDP checking step 92 above, the node checks whether excess bandwidth is available for forwarding the concatenated frame, at an excess bandwidth checking step 100. If excess bandwidth is available, the node forwards the concatenated frame at forwarding step 96. Otherwise, the node discards the frame, at a discarding step 104.

In alternative embodiments, the node can use other types of policies or decision logic to determine whether to forward or discard the concatenated frame based on its CDP and on the available bandwidth. For example, nodes that use Weighted Random Early Detection (WRED) sometimes gradually increase the probability of discarding frames having CDP=1, proportionally to the level of network congestion. As a result, the TCP/IP flow control mechanism of the node is able to adapt to the actual currently-available excess bandwidth.

The effectiveness of the pseudo-random CDP assignment method described above can be demonstrated by comparing this method to a deterministic (i.e., non-pseudo-random) assignment method that is based on majority voting. In the deterministic method, the ingress node determines the most frequently-occurring DP value among the data packets in the concatenated frame, and assigns this value as the CDP of the frame. When using such a deterministic assignment, however, the distribution of CDP values of the concatenated frames may deviate considerably from the DP distribution of the data packets.

For example, assume that 60% of the data packets in each concatenated frame are CIR packets, which are assigned DP=0, and that 40% of the data packets are EIR packets that are assigned DP=1. If the ingress node were to use majority voting CDP assignment, all concatenated frames would be assigned CDP=0 and none would be assigned CDP=1. As another example, assume the opposite scenario, in which 60% of the data packets in each concatenated frame are assigned DP=1 and 40% are assigned DP=0. In this case, CDP assignment based on majority-voting would cause all concatenated frames to be have CDP=1 and to be regarded as EIR frames. In both scenarios, the distribution of CDP values is considerably different from the distribution of DP values, thus causing significant deviation from the specified QoS of the connection.

When using the pseudo-random CDP assignment methods described herein, on the other hand, the likelihood of assigning each CDP value to a concatenated frame depends on the actual distribution of DP values among the data packets in the frame. Consequently, the distribution of CDP values closely follows the distribution of DP values.

The performance of the pseudo-random CDP assignment method described above was evaluated by the inventors using a computer simulation. The simulation tested a scenario in which 52-byte ATM cells are encapsulated in concatenated frames. In the simulation, ATM cells arrive at the ingress node randomly over time. Each cell is pre-assigned with a DP value of 1 or 0, in accordance with pre-set probabilities. The maximum number of cells in each concatenated frame, as well as the maximum delay caused by the encapsulation, are bounded by user-definable bounds. The concatenated frames are assigned CDP values in accordance with the pseudo-random assignment method of FIG. 3 above. Multiple concatenated frames and CDP assignments were simulated in this manner, and the distribution of CDP values of the frames was compared with the distribution of DP values of the cells.

The results of the simulation show that the distribution of CDP values closely follows the distribution of DP values. For example, when 40% of the cells had DP=0, 38.4% of the concatenated frames had CDP=0. In this particular scenario, the upper bound on the number of cells in a frame was set to nine cells, and the maximum encapsulation delay was set to twelve time units. (The basic time unit is typically defined as the minimal time interval between the potential arrival of cells on the simulated physical interface. For example, when simulating an OC-3 ATM interface, each time unit is 2.8 µS long.)

In some embodiments, the ingress node can determine P, the ratio of low-DP data to the total data, using a Look-Up Table (LUT) instead of performing an explicit division operation. For example, when transporting ATM cells over an MPLS connection, all data packets carry the same amount of data (fifty-two bytes, excluding the ATM HEC field). Thus, P is equal to the number of low-DP data packets in the concatenated frame (denoted L), divided by the total number of data packets in the frame (denoted N). Assuming that each concatenated frame may contain up to nine data packets, the following look-up table gives the possible values of P (expressed as 16-bit fractions in Hexadecimal notation) as a function of L and N:

| N | L | P |
|---|---|---|
| 1 | 0 | 0x0000 |
| 1 | 1 | 0xFFFF |
| 2 | 0 | 0x0000 |
| 2 | 1 | 0x7FFF |
| 2 | 2 | 0xFFFF |
| 3 | 0 | 0x0000 |
| 3 | 1 | 0x5555 |
| 3 | 2 | 0xAAAA |
| 3 | 3 | 0xFFFF |
| 4 | 0 | 0x0000 |
| 4 | 1 | 0x3FFF |
| 4 | 2 | 0x7FFF |
| 4 | 3 | 0xBFFF |
| 4 | 4 | 0xFFFF |
| 5 | 0 | 0x0000 |
| 5 | 1 | 0x3333 |
| 5 | 2 | 0x6666 |
| 5 | 3 | 0x9999 |
| 5 | 4 | 0xCCCC |
| 5 | 5 | 0xFFFF |
| 6 | 0 | 0x0000 |
| 6 | 1 | 0x2AAA |
| 6 | 2 | 0x5555 |
| 6 | 3 | 0x7FFF |
| 6 | 4 | 0xAAAA |
| 6 | 5 | 0xD555 |
| 6 | 6 | 0xFFFF |
| 7 | 0 | 0x0000 |
| 7 | 1 | 0x2492 |
| 7 | 2 | 0x4924 |
| 7 | 3 | 0x6DB6 |
| 7 | 4 | 0x9248 |
| 7 | 5 | 0xB6DA |
| 7 | 6 | 0xDB6C |
| 7 | 7 | 0xFFFF |
| 8 | 0 | 0x0000 |
| 8 | 1 | 0x1FFF |
| 8 | 2 | 0x3FFF |
| 8 | 3 | 0x5FFF |
| 8 | 4 | 0x7FFF |
| 8 | 5 | 0x9FFF |
| 8 | 6 | 0xBFFF |
| 8 | 7 | 0xDFFF |
| 8 | 8 | 0xFFFF |
| 9 | 0 | 0x0000 |
| 9 | 1 | 0x1C71 |
| 9 | 2 | 0x38E3 |
| 9 | 3 | 0x5555 |
| 9 | 4 | 0x71C6 |
| 9 | 5 | 0x8E38 |
| 9 | 6 | 0xAAAA |
| 9 | 7 | 0xC71B |
| 9 | 8 | 0xE38D |
| 9 | 9 | 0xFFFF |

Figure 4:
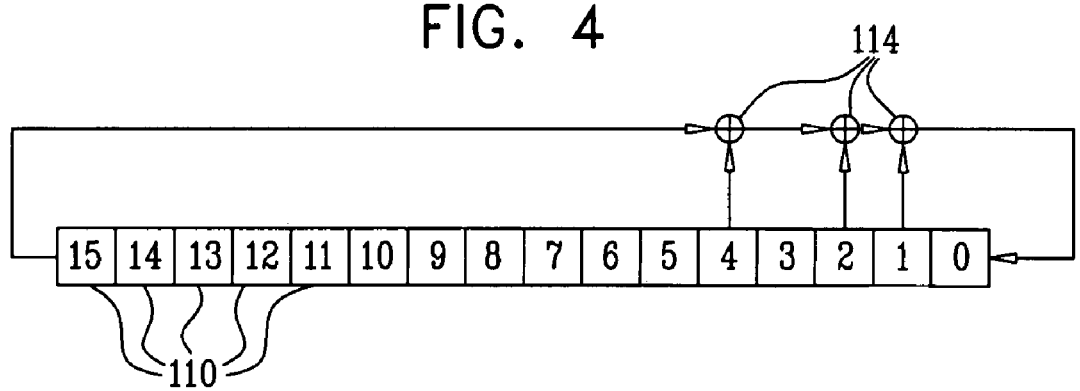
FIG. 4 is a block diagram that schematically illustrates a pseudo-random number generator, in accordance with an embodiment of the present invention.

FIG. 4 is a block diagram that schematically illustrates a pseudo-random number generator, in accordance with an embodiment of the present invention. LFSRs of this sort can be used to generate the pseudo-random number X used in the CDP value assignment methods described above. The exemplary LFSR shown in FIG. 4 comprises sixteen taps 110. Each tap holds a single bit, which may be set to "1" or to "0". At each clock cycle, the LFSR taps are shifted to the left. For example, the content of the tap labeled 9 moves to the tap labeled 10. The contents of some of the taps, in the present example the taps labeled 1, 2, 4 and 15, are summed using adders 114 and are fed back to the right-most tap labeled 0.

As a result, the sixteen-bit binary word represented by the sixteen LFSR taps changes pseudo-randomly with each clock cycle. The pseudo-random numbers generated by this LFSR are in the range 0x0001 to 0xFFFF. The LFSR configuration of FIG. 4 is an exemplary configuration, which is chosen purely for the sake of conceptual clarity. Any other suitable mechanism can also be used for generating pseudo-random numbers in the CDP assignment methods described herein.

Although the embodiments described herein mainly address concatenation and transport of ATM cells using the MPLS protocol, the principles of the present invention can also be used with other packet and cell types and/or other transport protocols. For example, the methods and systems described herein can be used for transporting Ethernet frames over MPLS networks. As another example, the data packets may comprise packets of a Wireless Local Area Network (WLAN) protocol, such as the protocols defined in the IEEE 802.11 standard. In alternative embodiments, multiple Point-to-Point Protocol (PPP) packets can be encapsulated into concatenated PPP frames using the methods and systems described herein. PPP encapsulation is described, for example, by Pazhyannur et al., in IETF RFC 3153 entitled "PPP Encapsulation," August, 2001, which is incorporated herein by reference.

Further alternatively, the principles of the present invention can be used to concatenate Internet Protocol Security (IPsec) data packets. IPsec encapsulation is described, for example, by Moon and Yeom in "IP Concatenation: The Method for Enhancement of IPsec Performance," Lecture Notes in Computer Science (LNCS)—High-Speed Networks and Multimedia communications, volume 2720/2003, March, 2004, pages 365-374, which is incorporated herein by reference. Packet concatenation in accordance with the methods and systems described herein can also be applied to cable communication systems, such as systems that operate in accordance with the Data Over Cable Service Interface Specification (DOCSIS).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   encapsulating multiple data packets, which carry data and have respective drop precedence (DP) values selected from a range of possible DP values, to produce a concatenated frame of a transport protocol;
   assigning a composite drop precedence (CDP) value from the range to the concatenated frame using a pseudo-random assignment function that depends on a distribution of the DP values of the data packets in the concatenated frame, and is defined such that a likelihood of assigning a certain CDP value from the range is proportional to a relative amount of the data in the concatenated frame, which is carried by the data packets whose DP value equals the certain CDP value; and
   transporting the concatenated frame through a communication network using the transport protocol, in accordance with the pseudo-randomly assigned CDP value.

2. The method according to claim 1, wherein the transport protocol comprises a Multiprotocol Label Switching (MPLS) protocol.

3. The method according to claim 1, wherein the data packets comprise Asynchronous Transfer Mode (ATM) cells.

4. The method according to claim 1, wherein the data packets comprise Ethernet frames.

5. The method according to claim 1, wherein the communication network comprises a ring network.

6. The method according to claim 1, wherein assigning the CDP value comprises generating a pseudo-random number that is greater than zero and is distributed between zero and unity, assigning the concatenated frame a first CDP value when the pseudo-random number is no greater than the relative amount of the data, and assigning the concatenated frame a second CDP value, which indicates a higher drop precedence with respect to the first CDP value, when the pseudo-random number is greater than the relative amount of the data.

7. The method according to claim 1, wherein assigning the CDP value comprises reading the relative amount of the data from a Look-Up Table (LUT).

8. The method according to claim 1, wherein the pseudo-random assignment function is defined such that a likelihood of assigning a certain CDP value from the range depends on a number of the data packets, which are encapsulated in the concatenated frame and whose DP value equals the certain CDP value.

9. The method according to claim 1, wherein assigning the CDP value comprises generating the pseudo-random assignment function using a Linear Feedback Shift Register (LFSR).

10. A network node, comprising:
a network interface, which is arranged to communicate with a communication network; and a processor, which is arranged to encapsulate multiple data packets, which carry data and have respective drop precedence (DP) values selected from a range of possible DP values, so as to produce a concatenated frame of a transport protocol, to assign a composite drop precedence (CDP) value from the range to the concatenated frame using a pseudo-random assignment function that depends on a distribution of the DP values of the data packets in the concatenated frame, and is defined such that a likelihood of assigning a certain CDP value from the range is proportional to a relative amount of the data in the concatenated frame, which is carried by the data packets whose DP value equals the certain CDP value, and to send the concatenated frame to the communication network using the network interface, so as to transport the concatenated frame through the communication network using the transport protocol, in accordance with the pseudo-randomly assigned CDP value.

11. The node according to claim 10, wherein the transport protocol comprises a Multiprotocol Label Switching (MPLS) protocol.

12. The node according to claim 10, wherein the data packets comprise Asynchronous Transfer Mode (ATM) cells.

13. The node according to claim 10, wherein the data packets comprise Ethernet frames.

14. The node according to claim 10, wherein the communication network comprises a ring network.

15. The node according to claim 10, wherein the processor is arranged to generate a pseudo-random number that is greater than zero and is distributed between zero and unity, to assign the concatenated frame a first CDP value when the pseudo-random number is no greater than the relative amount of the data, and to assign the concatenated frame a second CDP value, which indicates a higher drop precedence with respect to the first CDP value, when the pseudo-random number is greater than the relative amount of the data.

16. The node according to claim 10, wherein the processor is arranged to read the relative amount of the data from a Look-Up Table (LUT).

17. The node according to claim 10, wherein the pseudo-random assignment function is defined such that a likelihood of assigning a certain CDP value from the range depends on a number of the data packets, which are encapsulated in the concatenated frame and whose DP value equals the certain CDP value.

18. The node according to claim 10, wherein the processor is arranged to generate the pseudo-random assignment function using a Linear Feedback Shift Register (LFSR).

19. A computer software product used in a network node, the product comprising a computer-readable medium, in which program instructions are stored, which instructions, when read by a processor, cause the processor to encapsulate multiple data packets, which carry data and have respective drop precedence (DP) values selected from a range of possible DP values, so as to produce a concatenated frame of a transport protocol, to assign a composite drop precedence (CDP) value from the range to the concatenated frame using a pseudo-random assignment function that depends on a distribution of the DP values of the data packets in the concatenated frame and is defined such that a likelihood of assigning a certain CDP value from the range is proportional to a relative amount of the data in the concatenated frame, which is carried by the data packets whose DP value equals the certain CDP value and to send the concatenated frame to a communication network, so as to transport the concatenated frame through the communication network using the transport protocol, in accordance with the pseudo-randomly assigned CDP value.

* * * * *